United States Patent [19]

Vincent et al.

[11] Patent Number: 4,562,535
[45] Date of Patent: Dec. 31, 1985

[54] SELF-CONFIGURING DIGITAL PROCESSOR SYSTEM WITH GLOBAL SYSTEM

[75] Inventors: Geoffrey P. F. Vincent; Nicholas K. D. Ing-Simmons; John McGrath, all of Bedford, England; Marvin C. Conrad, Houston, Tex.

[73] Assignee: Texas Instruments Incorporated, Dallas, Tex.

[21] Appl. No.: 365,813

[22] Filed: Apr. 5, 1982

[51] Int. Cl.[4] ................... G06F 3/04; G06F 15/16
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 3,480,914 | 11/1969 | Schlaeppi | 364/200 |
| 4,191,996 | 3/1980 | Cherley | 364/200 |
| 4,253,144 | 2/1981 | Bellamy et al. | 364/200 |
| 4,268,901 | 5/1981 | Subrizi et al. | 364/200 |
| 4,335,426 | 6/1982 | Maxwell et al. | 364/200 |
| 4,373,181 | 2/1983 | Chisholm et al. | 364/200 |
| 4,400,775 | 8/1983 | Nozaki et al. | 364/200 |

Primary Examiner—Eddie P. Chan
Attorney, Agent, or Firm—Robert D. Marshall; N. Rhys Merrett; Melvin Sharp

[57] ABSTRACT

A digital processor system including several function modules where each module includes circuitry to perform at least one computational task and the circuitry to transfer information containing that modules respective computational task capability to a global memory upon initialization of each module and further circuitry to interface to the global memory upon initialization together with circuitry to interface to the global memory to determine each modules address. Further included is an information bus connected to the function modules and the to global memory. This system configuration allows for the system to self-configure upon power up intialization.

6 Claims, 22 Drawing Figures

SELF-CONFIGURING DIGITAL PROCESSOR SYSTEM WITH GLOBAL SYSTEM

BACKGROUND

1. Field of the Invention

This invention relates to multiple computer systems and more specifically to distributed multiprocessor systems with the capability of dynamic self configuration.

2. Description of the Prior Art

Early computers included a single central processing unit that was either dedicated to a specific control function or a batch job processing function. In the single control function, the computer was preconfigured to perform a certain dedicated set of functions for a given task. In other words, the total computer capability was dedicated to this single task. If the task was such that not all the computer capability was required the remaining computer capability was unused. If, on the other hand, the task was such that more computer capability was required, another computer with increased capability replaced the computer with lesser capability. Batch processing, on the other hand, was used to perform several independent computational jobs. As computer technology changed and the microprocessor was introduced, computer system architecture changed. Microprocessor based systems were used to support functions that required a smaller amount of computer capability. Therefore, it became cost effective to provide computer support, based around microprocessors, for many more functions. In addition, computer architecture included many microprocesors that each served individual functions that were in turn tied together by a common system bus. Such a configuration is referred to as a multiprocessor configuration. Many multiprocessor configurations consist of individual microprocessor elements contained within individual circuit boards. Each individual circuit board is plugged into a configuration including the system bus to enable communication between the module boards. This configuration is often referred to as the "motherboard". The motherboard only consists of connectors to mate to the individual microprocessor modules and wires to provide communication between connectors.

In order to construct a system of multiprocessor boards, the whole system must be designed and conceived in the beginning. In other words, the system designer must be aware of all of the individual parts and detailed requirements. The designer then must develop software using hardware development tools in order to put the system together. Therefore the market for such a system is strictly limited. The invention herein described allows for the standard packaging of complex, real time, intelligent functions that incorporate both software and hardware features in a single, physical component. The system designer is not required to pre-configure these components into the application. The act of physically inserting the components into the system bus and applying power causes their presence and their capability to be known to the other components of the system. This separates what is required to build such modules, (i.e., a skilled knowledge of microprocessor hardware and software) from what is required to configure and use them in an application (i.e., little more than the knowledge of the application itself).

One type of functional module that can be developed is a "user interface" that will connect to a keyboard/display terminal (a teletype or some other device that will provide an interactive user interface). This module can contain software to implement a "user friendly" dialogue that will permit a user without specialist computer experience to instruct the system to carryout his basic wishes. This interface might use, for example, the BASIC language or it might be an application-specific interface designed for implementing process control, the building of graphic displays, robot controls, etc.

The set of functions available to a user are dynmatically defined by the set of modules that are plugged into the system bus. Some of these modules may implement "pure processing" functions, e.g., calculation, text manipulation. Others may interact physically with the outside world, e.g., turning ON or OFF motors, controlling a domestic heating system, or an industrial robot, or providing printed, graphically displayed or speech output. The system can be changed by plugging or unplugging the modules at will. Obviously, however, changing the set of boards would normally require that the system be redesigned in terms of either software or hardware. However, this system can be constructed to perform more complex tasks by adding modules. Previously, this reconfiguration required not only the physically plugging in of the modules, but also some action, such as setting switches, changing the configuration table for the system (in software), (or in the case of a computer system), executing a system generator configurator (SYSGEN) utility program. This is a separate activity from the physical act of connecting the modules together and usually requires special development tools or a specialist with the knowledge of the technology used to implement the modules or else the intervention of a specialist, consultant or agency. This invention provides, however, a means by which function modules which are simply plugged together in any combination can self-configure themselves. Systems can thus be constructed by assembling the parts and fitting them together without any knowledge beyond what is required to use the system.

SUMMARY OF THE INVENTION

In accordance with the present invention, a digital processor system is disclosed that includes several function modules. Each function module includes circuitry to perform at least one computational task. Each module further includes the capability to transfer information containing that module's respective computation task capability to a global memory upon the system initialization. The module further includes means to interface to the global memory to determine that module's address. Also provided is an information bus connected between the functional modules and the global memory.

In the preferred embodiment, the digital processor system includes a single information bus that connects a number of function modules to a global memory. The global memory serves as a function module directory. Upon initialization, each function module accesses the global memory and stores in the global memory that module's computational task capability. Further, it determines from the global memory the address of that module. After all modules have accessed global memory and have stored their computational capability and have determined their address, the system functions in a normal manner, except that when a module requires a computational task to be performed by another function module, the module requesting the task performance accesses the global memory to determine where or at what address is the other module to perform that task. Upon finding out the address of the other module, the requesting module then can initiate a message request to the second module in order to have that task performed.

DETAILED DESCRIPTION OF THE PREFERRED EMBODIMENT

This invention includes a method of building solid state function modules that can be plugged into a suitable backplane in any combination. On power-up, a system constructed from these modules will self-configure and establish all necessary software and hardware linkages so that the functions implemented on the separate modules can exchange messages and interact with each other at a high level. Individual function modules (each of which might implement a management system, a video graphic output function or a machine controller) can be constructed as a system component without any knowledge of the rest of the system in which they are to be used.

The described implementation will require the system to be powered down in order to avoid electrical damage during removal of boards. This is a limitation of the particular system bus defined for demonstration of the invention. A slightly more expensive system bus design would allow dynamic insertion/removal without affecting the performance of the self-configurating function modules. The preferred embodiment is one in which the system will be powered down. While there has been a great deal of talk in the industry about solid state software, there is a much smaller quantity of the product available. Any item of solid state software is necessarily restricted to a particular process or architecture and instruction set and may also be restricted to a particular position in the processor memory address space. These limitations restrict the use of the solid state software with other types of processors. This invention, however, significantly extends the concept of solid state software by implementing active plug-in components (solid state functions) which include their own processor memory and input/output and can perform actions independently. The modules in the preferred emodiment will be implemented on the E-bus but it should be obvious to one skilled in the art that any multiprocessor backplane bus will accomplish the same results.

FUNCTIONAL ARCHITECTURE

Figure 1:
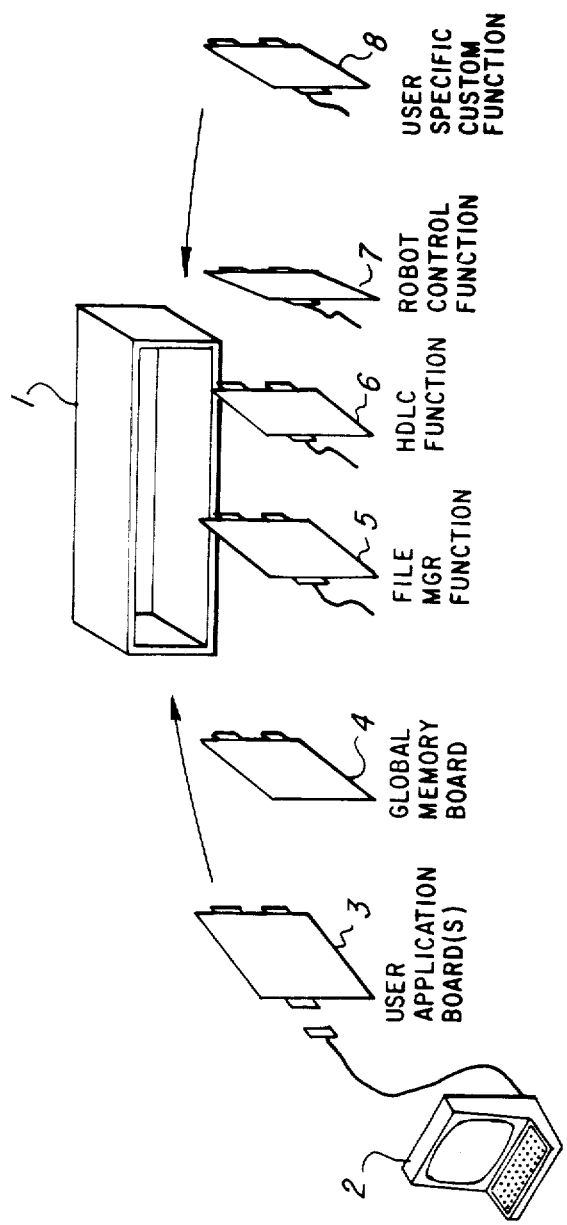
FIG. 1 is an illustration of the digital processor system interconnection to a chassis.

The realization described herein is based on a theoretical model for the interaction between asynchronous and independent intelligent functions known as function-to-function architecture. Further description of this type of architecture is contained in the Sept. 3, 1981 of *Electronic Design* pages 141 to 156 and is herein incorporated by reference. The basic module of this function-to-function architecture describes the interaction between two asynchronous actors as a message exchange. When one actor requests a function to be formed by a second actor, a message request is sent to the second actor. The second actor then performs the function and sends the response by a message to the first actor which in turn will be waiting for the response. The message consists of a parameterized request for a function to be performed which is sent by the communication medium to the actor which is to perform the function. Having sent the request, the originating actor can continue with other work or it can wait for the confirmation response from the second actor which indicates that the function has been performed. In this embodiment, actors are represented by function modules, which in turn, consists of printed circuit boards containing a microprocessor, a large amount of ROM memory to store function programs, and a quantity of RAM memory to support function activities. In the initial implementation, these boards will plug into a standard backplane which provides a power supply and communication signals. FIG. 1 illustrates such a backplane. The backplane or mother board is contained in the chassis. A set of boards 3, through 8, are shown that would plug into chassis 1. Note that board 3 includes an interface to a user terminal 2. Board 3 then represents the user application board which provides the functional interface between the user and the board system. Board 4 could be a global memory board. Boards 5, 6 and 7 represent boards selected from a functional library and board 8 represents a user's specified custom developed functional board that could implement a specially designed function for the specific user.

Figure 2:
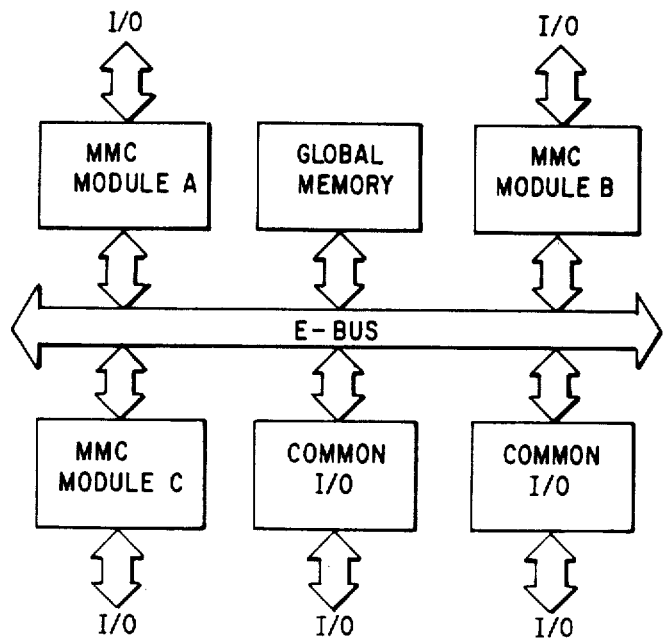
FIG. 2 is a block diagram of a digital processor system as shown in FIG. 1.
Figure 3:
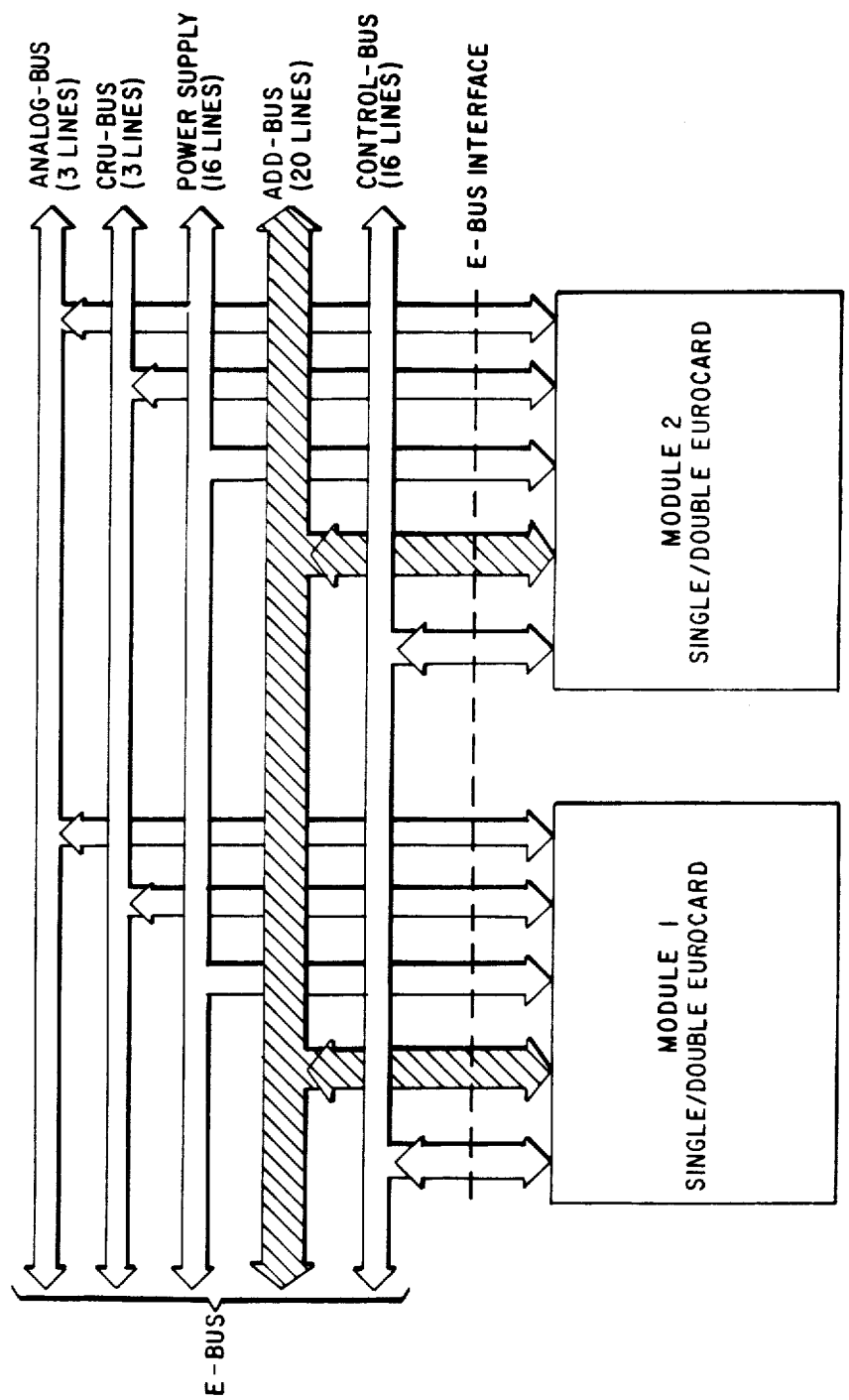
FIG. 3 is a block diagram showing the information bus.

In the preferred embodiment, the chassis 1 will implement the E-bus communication standard. The E-bus system is discussed in detail in the Texas Instruments publication entitled, *E-Bus System Design* by Al Thoff et al, published by the Texas Instruments European Semiconductor Group, September 1978, Pub. No. MP402 and is incorporated by reference. According to this bus standard, the backplane bus will contain an unspecified number of function modules plus a passive global (RAM) memory module. FIG. 2 represents a block diagram of a typical E-bus structure. Modules A, B and C represent functional modules containing microprocessor or microcomputer capability. The blocks marked "common I/O" contain input and output interface circuitry that is addressable by the E-bus to some external peripherals. In addition, note that modules A, B and C each contain their own specific input/output circuitry that allows the specific modules to input and output information without access to the E-Bus. The actual module connection to the E-Bus is illustrated in FIG. 3. Notice that the E-Bus standard includes three analog bus lines, three communication register units (CRU bus lines) 16 power supply lines, 20 address data lines, and 16 control lines.

According to the E-Bus standard, an arbitration mechanism exists whereby one and only only module may gain access to the bus (and thereby the global memory) at one time. A function module having gained access to the bus can assert a bus lock to prevent other modules from accessing the bus for a short time. This permits uninterruptable operations to be performed on global memory. Processors located on function modules will spend most of their time executing local functions using local memory and I/O and only accessing the E-Bus to send or receive messages or responses or to read or write into the global memory.

Figure 4:
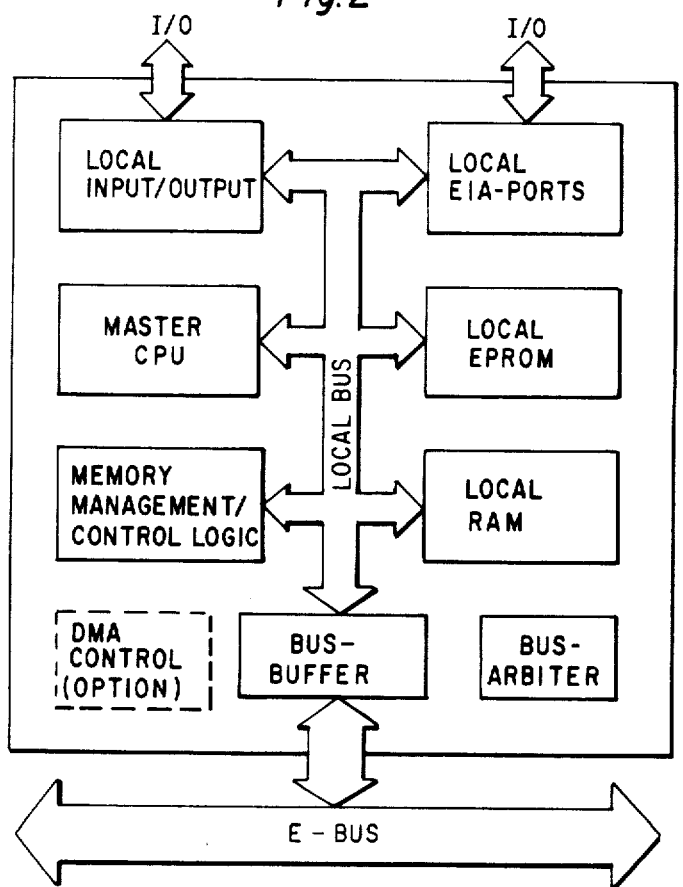
FIG. 4 is a block diagram of the function module.

Unlike conventional computer systems, there is no central processor. Systems are built by plugging individual function modules into the communication system. FIG. 4 illustrates one such module. In this case, the communication system consists of a backplane bus, which contains a global memory module. The system is managed entirely through passive data structures stored in the bus global memory. One might think of the global memory as containing the capability of each functional module in the system. Each functional module contains some read-only memory (ROM) code that defines legal operations that can be performed on the data structures in the global memory. A module accessing the global memory can perform any legal operation on the global data structure and must leave them in a legal state. The data structures in the global memory include a function table that associates a function name or code with the function module (a) which implements it and a function request for each functional module in the system. Each distinct function has a global unique identifying name or code. A function request takes the form of a block of data containing the function name or code followed by the function parameters (if any). This packet of data can be moved around in memory or transmitted by any type of data link or transmission network without affecting its integrity. To send a function request, an originating function module will determine the name or code of the function required from the global function table. It will then append the function request to the request queue in the global memory for the appropriate function module and interrupt this function module to indicate that a request is pending. Uninterruptable operations will be used where appropriate to assure that the integrity of the global data structure is maintained. That is, when one function module is writing or reading into the global memory, other functional modules will be restricted from simultaneous access.

Figure 5:
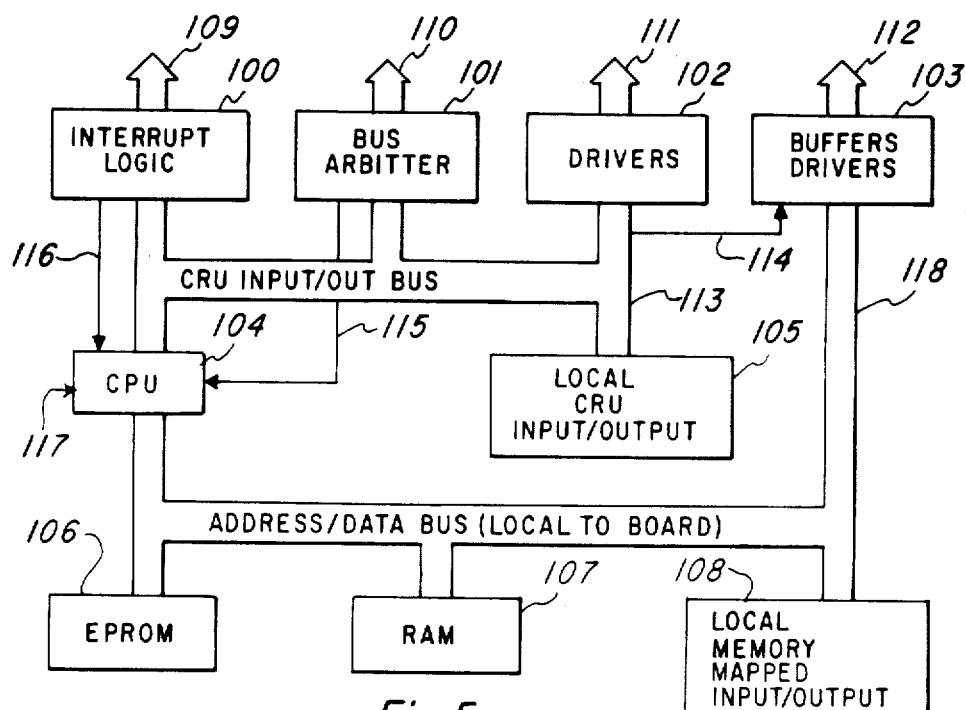
FIG. 5 is a block diagram showing the internal information flow on a function module.

FIG. 5 illustrates the module layout for the preferred embodiment of this invention. Block 100 contains the interrupt transmit and receive logic. Signals 109 communicate the E-Bus interrupt information to the interrupt logic block 100. These signals include INTERRUPT (INTER-), INTERRUPT ACKNOWLEDGE (INTA-), BUS CLOCK (BUSCLK) and BUSY (BUSY-). The INTERRUPT signal shows the presence of an interrupt code on the multiplexed addressed data bus which is also contained in lines 109 interfacing to the interrupt logic block 100. The interrupt logic block 100 also contains the line 116 that is input directly to the CPU block 104 to notify the CPU that an external message interrupt is present. Also note that CPU 104 also includes line 117 for internal interrupts internal to the module board. The main communication the interrupt logic 100 and the CPU 104 is the CRU input/output bus 113. The CRU bus 113 also is connected to the bus arbiter 101. The bus arbiter 101 is connected to the E-Bus arbitration control lines GRANTIN, GRANTOUT, BUSCLOCK (BUSCLK-) and BUSY (BUSY-). Line 115 connects the bus arbiter 101 with the CPU 104 to provide the IRQI which is the interrupt request line and BRQ which is the broadcast request line. The extended address lines are connected by the CRU bus 113 to the E-Bus via drivers 102 driving lines 111. The local CRU input/output block 105 contains local CRU input/output interface circuitry for devices on the functional module board.

The CPU 104 is also connected to internal board components by the address/data bus 118 which is local to the board. However, this address/data bus 118 is connected to a set of buffer drivers 103 which are in turn connected to the E-Bus to provide lines 112 which include memory enable (MEMEN-), ADDRESS LATCH (ALATCH), DATA ENABLE (DEN-), WRITE ENABLE (WE-), MEMORY WIDTH (indicating an 8 bit or 16 bit transfer) and READY (READY-) that indicates that a memory cycle can be concluded in the current bus clock cycle. The address/data bus 118 can also provide address or data to the ADIO through ADI15 lines for the E-Bus via the bus drivers 103. Most importantly, however, CPU 104 is connected via the address/data bus 118 to its internal memory which for example can include an EPROM memory 106, a RAM memory 107 and a local memory mapped input/output port 108 for accessing devices on the board or directly interfaced to this board.

INTERRUPT LOGIC

Figure 6:
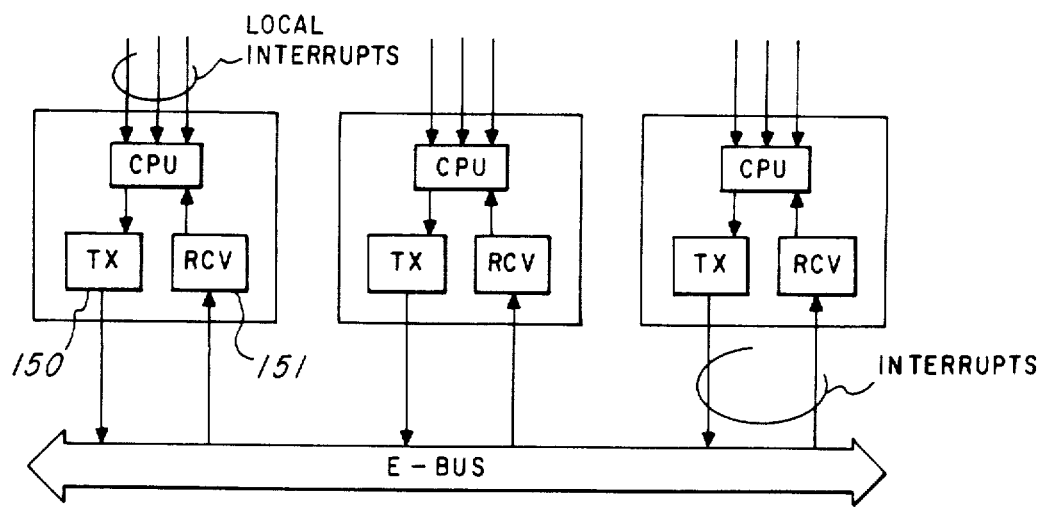
FIG. 6 is a block diagram illustrating the transfer of interrupts between function modules.
Figure 7:
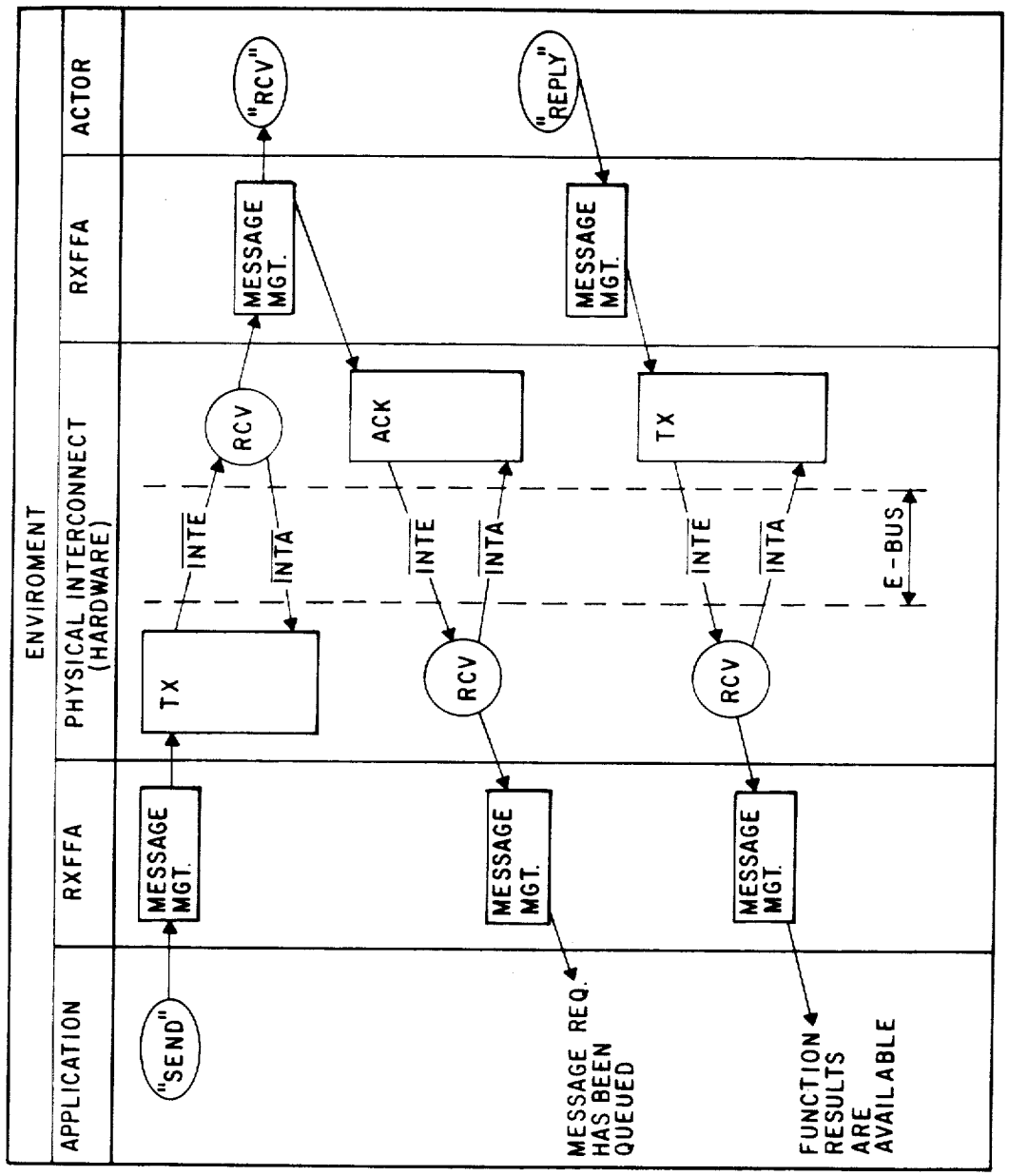
FIG. 7 is an illustration of the interrupt message protocol.

Message passing has received wide acceptance as a means for synchronization and communication between software modules. Further, message passing offers an attractive basis for the control of distributed function modules. In order to facilitate the parallel development of interacting functional modules, the message passing mechanism must be ridgedly defined. Thus when functions are physically distributed, the interconnection medium or communication medium must permit the routing of messages between cooperating entities in order that the system may achieve its overall purpose. Within a multiprocessor system, the reallocation of executing tasks in response to external stimuli is synonymous with interrupts. The following is a definition of the interrupt mechanism implemented on the E-Bus which will support function message cycles. FIG. 6 illustrates three functional modules connected to an E-Bus. Note that each functional module contains the capability to receive local interrupts, i.e., received only by the specific board from devices contained on the board or from devices connected only to the board and interrupts from the E-Bus through the interrupt transmitting and interrupt receiving blocks 150 and 151, respectively. To maximize system performance, only those processing modules which are actively involved in message passing should contain the interrupt logic. The mechanism used for the message transfer in the preferred embodiment of this invention has a most significant influence on the system throughput, i.e., accomplished task per units time. It is implicit in the message oriented system that the control overheads are minimum when compared to the functional capability and throughput. Optimally, we would allocate the message passing and management task to a device which executes in parallel with the functional hardware. These devices would have access to a dedicated message bus. The basic sequence involved in this embodiment is called a functional call and is shown in FIG. 7. As can be seen, there are three levels of interrupt acknowledgement. The first level is the vector transfer acknowledge. This is the lowest level acknowledgement and insure that the transmitting hardware informs the message management executive as to the integrity of the attempted vector transfer. This level is shown in the diagram of FIG. 7 (INTA). The executive of module A initiates the interrupt send request through the message manager to the transmit hardware which sends the interrupt enable (INTE-) signal to module B receiver. The receiver in turn notifies the module B message manager to communicate with the module B software. The module B interrupt receiving hardware acknowledges the received interrupt by sending the interrupt acknowledge (INTA-) signal to the module A transmitter logic. The second level of acknowledgment is the software acknowledgement. This informs the calling function (module A in FIG. 7) that the request has been queued by the responding function (module B in FIG. 7). This is shown in FIG. 7 as "ACK". More specifically, the message manager of module B initiates the acknowledge through the interrupt hardware which in turn transmits the interrupt enable (INTE-) to the module A interrupt logic receiver. The interrupt logic receiver upon receiving the INTE signal returns an INTA- or INTERRUPT ACKNOWLEDGE to the module B interrupt hardware. The module A interrupt receiving hardware also notifies the module A message manager which in turn notifies the module A software that the message request has been queued. A negative acknowledgement can be sent if the responding function cannot service the request. The third level of acknowledgement is the reply acknowledgement. This acknowledgement to the calling function (module A in FIG. 7) means that the responding function has completed its task and that the results are available. Referring to FIG. 7, the module B application software initiates the reply to the module B message manager which in turn initiates the interrupt through the module B interrupt transmitting hardware. The interrupt transmitting hardware initiates the INTE or INTERRUPT signal to the module A interrupt receiver. The module A responds to the module B interrupt transmitter with the INTA- signal. Upon receiving the interrupt reply, the module A interrupt receiver notifies the module A message manager which in turn notifies the module A application software that the functional results are available. The interrupt vector for these operations is a 16 bit word which dedicates the first five bits for the destination identifier, the next two bits for a transfer code, the next five bits for the source identifier and the last four bits for a sequence number. The two bit transfer code includes a designator for the send operation, for the reply operation, for the acknowledgement and for wait on acknowledgement. This transfer code defines the nature of the vector transfer and enables the queueing of function requests to be acknowledged without accessing global memory. The destination and source identifiers, of course, identify the destination board for the interrupt and the source board of the interrupt. The sequence number represents the number of pending requests. This pending request number can be stored in global memory. This sequence number therefore defines which entry in the global memory interrupt storage table this particular vector transfer is associated with. To initiate the interrupt cycle, a transfer request is made by writing an interrupt request bit, i.e., "IRQI", to the E-Bus arbiter. The initiating processor is then free to resume local execution while the E-Bus arbiter and the interrupt logic handle bus arbitration control and vector transfer. Only if the vector fails is the local processor interrupted to take the appropriate action.

Figure 8:
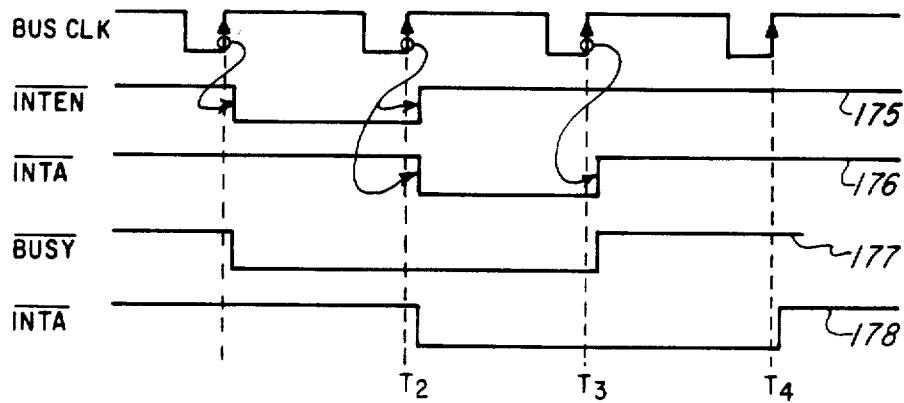
FIG. 8 is a timing diagram of the interrupt message transfer.

FIG. 8 illustrates the timing for the interrupt procedure. Control of the system bus is achieved by the transmitting interrupt logic when INTE is driven active low. This causes each board module to compare the destination field of the broadcast vector with its own identifier and drive the INTA active low if they are the same. BUSY is driven active low to insure that bus control is retained over the whole cycle. Referring to FIG. 8, line 175 represents the interrupt enable transmission from the transmitting module. Line 176 represents the interrupt acknowledge sent by the transceiving module. Line 177 is the BUSY line. All events are synchronized to the positive transition of BUS CLOCK (BUSCLK). This insures the timing is a function of clock frequency only and not duty cycle. Each receiving module has an interrupt vector buffer. This can be made as deep as requirements dictate. When the buffer is full, i.e, in the event that the local processor does not service global interrupts for extended periods, additional vectors are refused. A receiving module signals this fact to the transmitting module by extending the duration of INTA as shown in FIG. 8, line 178. The busy line is released during the third bus clock (BUSCLK) to allow arbitration and back-to-back transfers. The interrupt request bit which is initiated to hold sequence is reset by INTA. Three diagnostic interrupts can be generated by the transmitting hardware interface. The first indicates physical bus failure, the second indicates that the destination module did not respond to its address. This could be for a number of reasons, i.e., the board has been removed or has isolated itself from the system. The third interrupt diagnoistic is that the destination module could not store the vector. This combination of diagnoistic interrupts allows considerable scope for fault diagnoses and dynamic system reconfiguration. Also note during the interrupt cycle shown in FIG. 8, the transmitting module samples INTA immediately prior to the times marked as "T2, T3 and T4". At T2, if the INTA bit is 0, this indicates a physical bus failure and the sending processor is to take an appropriate local action. However, after T2, if INTA is 1, then the transfer is proceeding correctly. At the end of T3, if INTA is 0, the receiving module is responding. If INTA is 1, the destination module, i.e., the intended receiver is no longer present or has ceased responding. At the end of T4, if INTA equals 0, the destination buffer is full and the sending processor should queue this transfer request. If, however, INTA is equal to 1, the vector has been transferred successfully.

Figure 9:
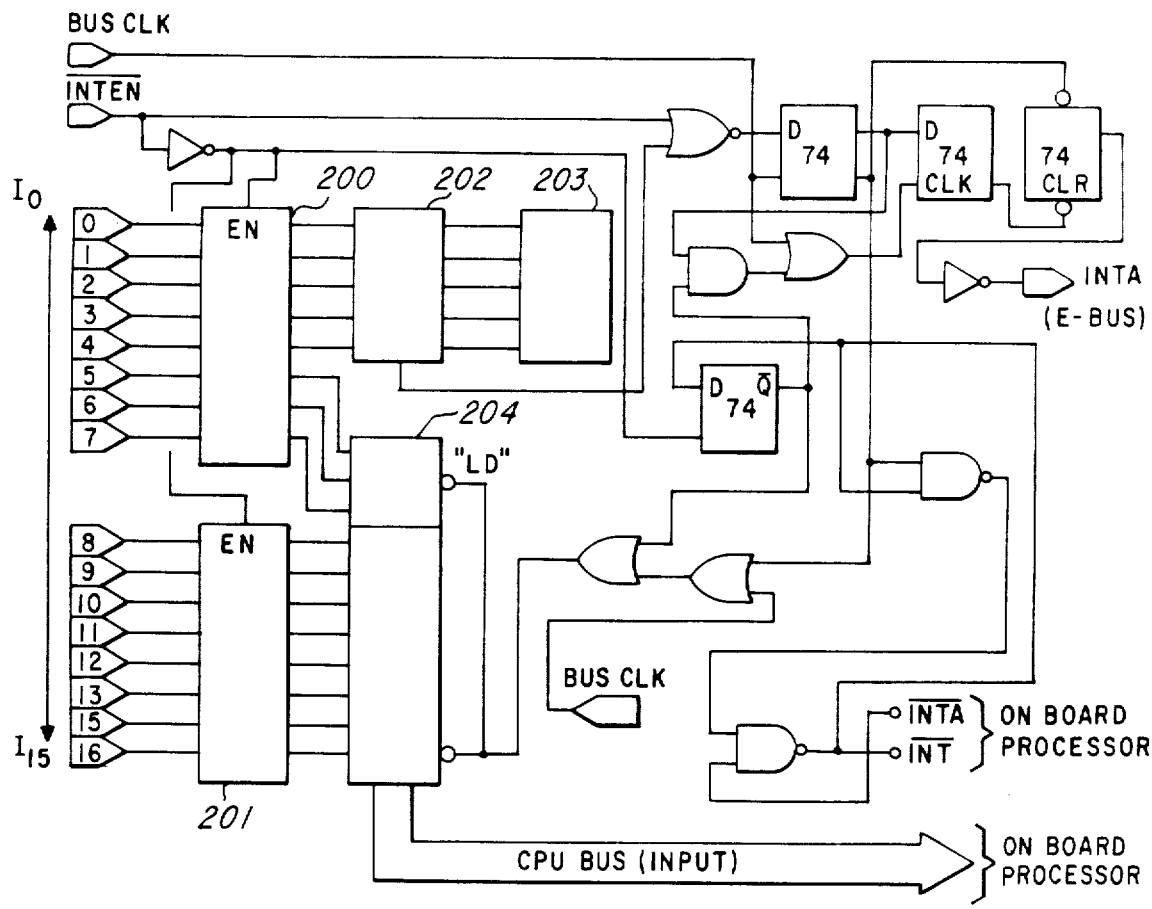
FIG. 9 is a schematic diagram of the module interrupt receiving circuitry.

FIG. 9 illustrates the receiving portion of interrupt logic 100 in FIG. 5. Buffers 200 and 201 receive the 16 bit address data lines received by the interrupt logic 100. Note that the top five bits are input to block 202 which is a comparator. Comparator 202 compares the destination address to the address of that board which is stored in block 203. The remaining information on the interrupt vector, i.e., the transfer code, source identification and sequence number is coupled to block 204 and will load this information if the interrupt is intended for this board as determined by comparator 202. It should be noted that block 203 is programmable from the board. This identification in block 203 can be loaded by the CRU bus by data lines not shown. This information may originate from global memory and is contained in the module CPU function identification register. This register is always loaded during the power-up sequence. The remaining logic in FIG. 9 illustrates the logic to return the INTA- signal back to the E-Bus as shown. Also INTA- and INTE together with the CRU bus are coupled to the on-board processor as shown. Note that this logic receives the bus clock (BUSCLK) and the interrupt signal INTEN- as previously discussed.

Figure 10:
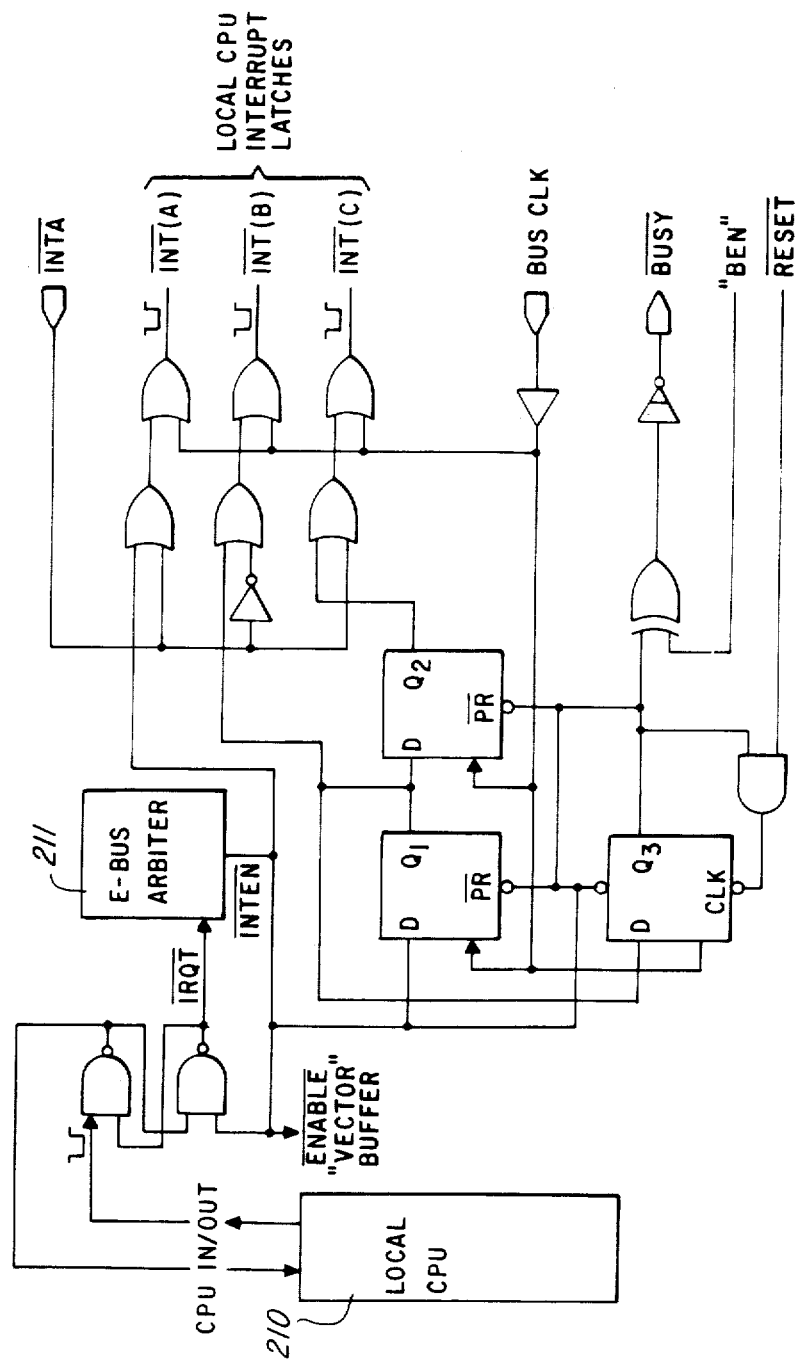
FIG. 10 is a schematic diagram of the interrupt transmitting circuitry.

FIG. 10 illustrates the transmit portion of interrupt logic interrupt logic block 100 as shown in FIG. 5. Note that the CPU on the board shown as block 210 initiates the interrupt by causing the IRQI- signal to be transmitted to the E-Bus arbiter block 211. The enablevector buffer signal is coupled to the logic which transmits the actual vector. The remaining logic shown include the logic to receive the INTA- from the E-BUS and produce the three internal local CPU interrupt latch signals as shown. Bus clock is also received by this logic and is used in producing the BUSY- signal previously discussed.

The E-Bus arbiter shown as block 211 in FIG. 10 and block 101 in FIG. 5 is illustrated in FIG. 11. The bus arbiter determines the priority of access of a module to the E-Bus. Specifically, the priority of a module within an E-Bus system is determined by reference to the GRANTIN/GRANTOUT line. Determination may take two forms, either serial or parallel. Serial priority requires that all modules have unique priority ranking. Parallel priority allows certain modules to have the same ranking. E-Bus supports serial priority control using the Daisy Chain principle which will be described in detail. Since the specification of a bus acquisition insures that priority determination is transparent, parallel priority control can be used in special applications. An advantage of serial priority control, however, is that no additional hardware is needed. Parallel bus abritration requires additional hardware which is discussed in the E-Bus system design manual by Texas Instruments, previously referenced. In serial priority control, the individual slots in the chassis are assigned a fixed priority. At each slot, the GRANTOUT line on one module is connected to the GRANTIN line of the next module. This results in a linear sequence or ranking of priorities which decreases from one direction to another, i.e. one slot having the highest priority and the opposite end of the chassis having the lowest priority. The other signals required for control of the bus, BUSY and BUSCLK- are available at each slot in parallel. For the correct operation of serial priority chain, the GRANT lines must not be broken which means there must be no empty slot in the boards in the system. If this is not possible, then on any free slot between boards, GRANTIN AND GRANTOUT must be connected, i.e., joined using jumpers on the backplane. It should be noted that this discussion is the requirement of the E-Bus specification and would not be required by this invention if this invention were implemented on a different bus architecture. The GRANTIN line together with the BUSY-line which signifies occupation of the E-Bus essentially controls a bus acquisition. If an internal bus request occurs on a module, then the GRANTOUT line is set to a low level, clocked synchronously with BUSCLK-. Thereafter the stages of BUSY- and GRANTIN are evaluated on each positive edge of BUSCLK-. If the E-Bus is not occupied (BUSY- at high level), and GRANTIN is active (high level) then acquisition of the bus can occur by activating the BUSline. If BUSY- is active or GRANTIN inactive, then acquisition of the bus must be delayed until E-Bus is free.

If a module has mastery over E-Bus and another module of higher priority requests the bus (GRANTIN becomes inactive) then the bus must be released after the present cycle has been executed. The only exception is in the case of a particular cycle which must not be interrupted, for example, testing and resetting of system flags in multiprocessor or computer operation.

Figure 11A:
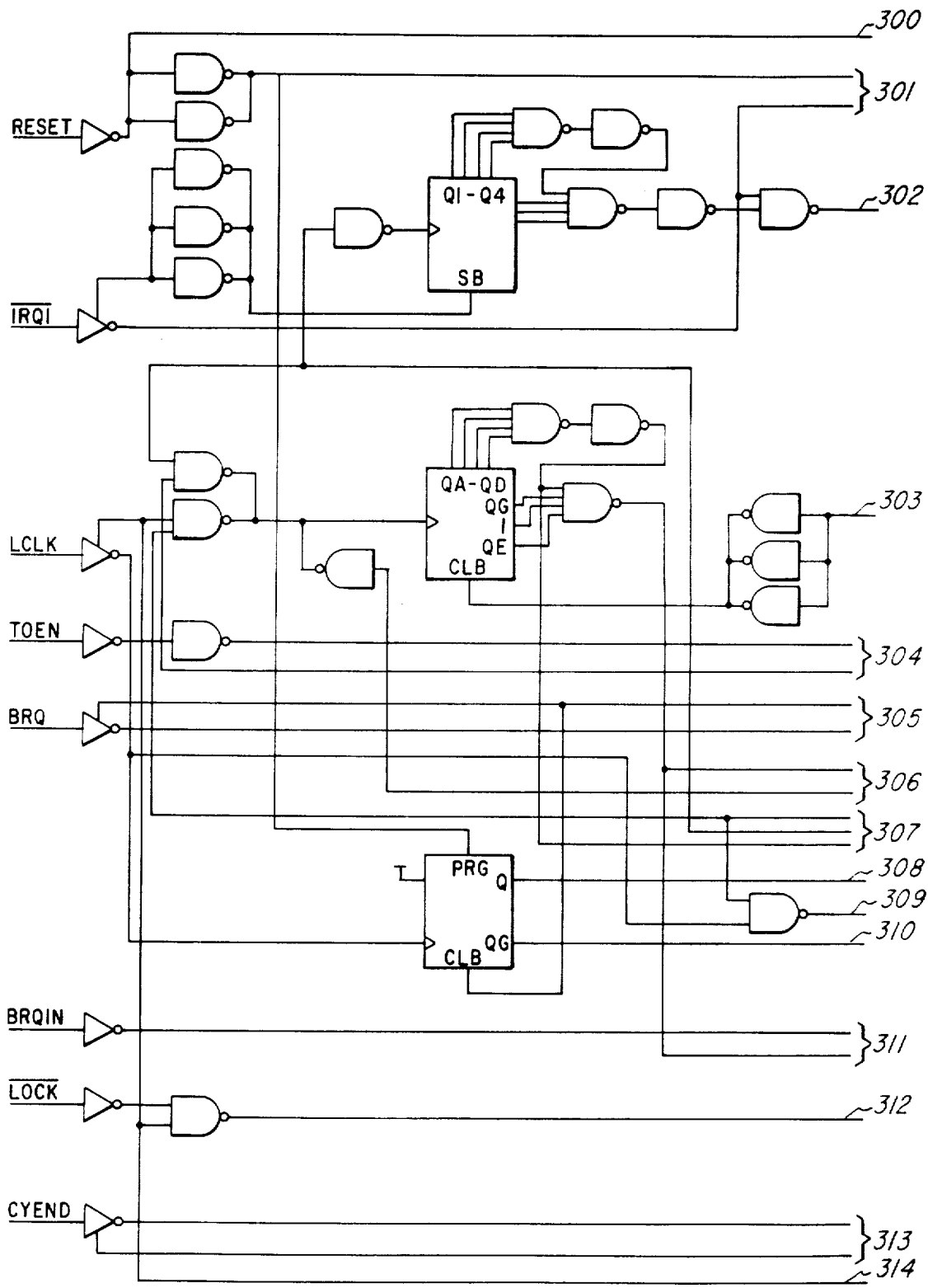
FIGS. 11a, 11b, and 11c are schematic diagrams of the bus arbiter circuitry.
Figure 11B:
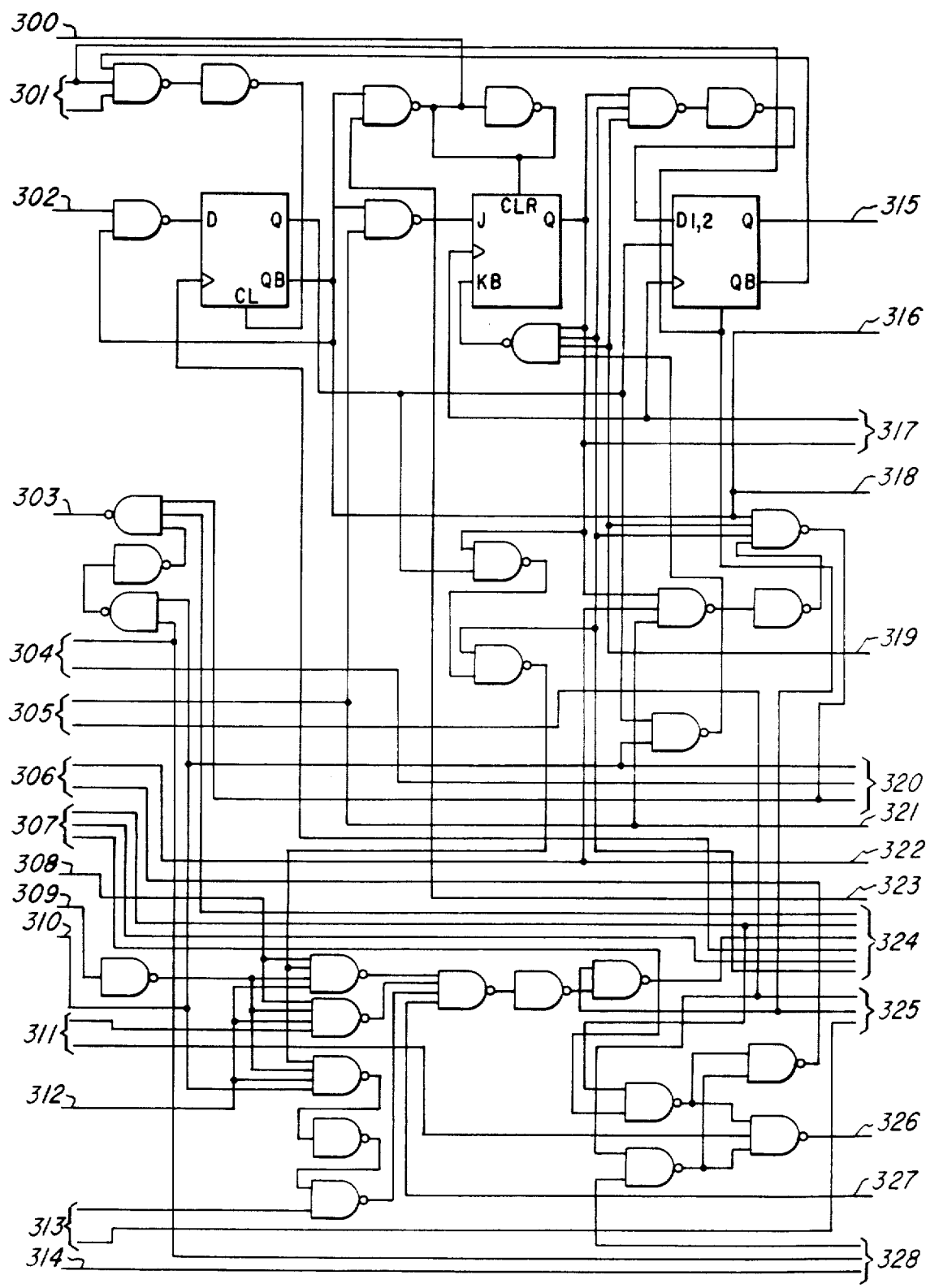
Figure 11C:
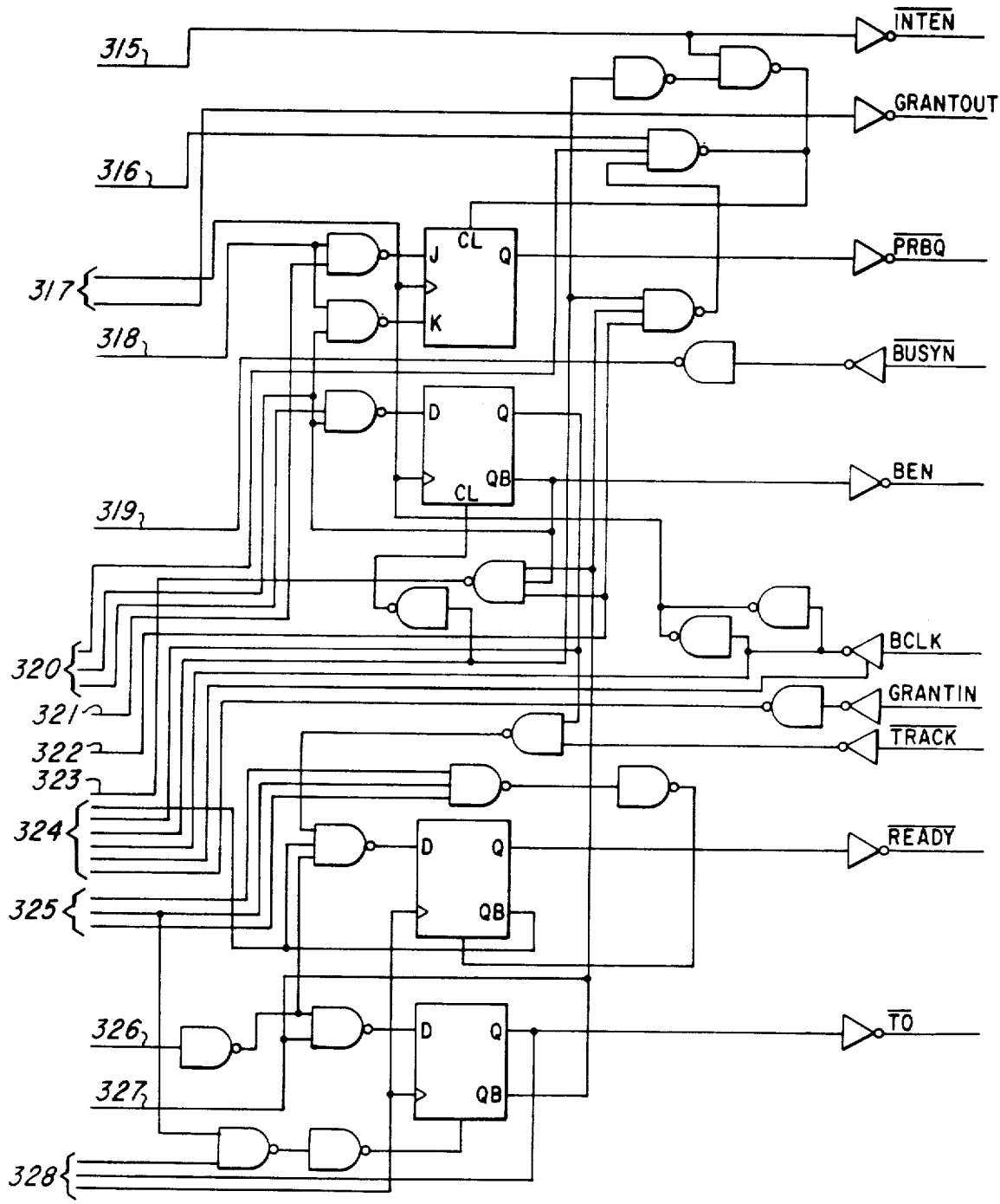

FIGS. 11a, 11b and 11c illustrate the E-bus arbiter circuit. In the preferred embodiment of this invention, this circuitry will be implemented using a gate array. This circuitry while performing the bus arbitration functions previously discussed is best understood by understanding the inputs and outputs shown. In FIG. 11a, the RESET signal (RESET) is received by the module from the E-bus and serves the function of initializing the module arbitrator. The interrupt request signal (IRQI-) is received from the CPU and informs the arbiter that the CPU would like to transmit an interrupt vector over the E-Bus. The sending of the interrupt vector also causes the transmission of the INTEN- signal (INTERRUPT ENABLE). The next signal is the local clock (LCLK) from the CPU and is used to synchronize the transmission of a READY signal to the CPU upon the reception of the TRANSFER ACKNOWLEDGE signal from the E-Bus. The TIME OUT ENABLE (TOEN) signal originates from the CPU to allow the time out interrupt from the arbiter if one of two situations occurs. The first is when an attempt is made to access memory and the attempt is unsuccessful either because the memory would not accept the address or that the address does not exist. The second is when the arbiter attempts to access the E-Bus and cannot access the E-bus for a certain period of time. The next signal is BUSREQUEST (BRQ) and comes from the CPU to indicate that the CPU is trying to place address or data onto the E-bus. It should be noted that the bus arbiter upon receiving a bus request from the CPU will control the E-bus until released or until a higher priority access is received. The next signal is BUSREQUESTIN (BRQIN) and is used to indicate to a higher priority device that this specific module is requesting a temporary access to the bus. The bus lock (LOCK-) signal originates from the CPU and locks the bus from higher priority access in order to complete memory transactions. This signal is required to restrict any other modules from accessing the bus in order to complete read/write or modify cycles in global memory. The CYCLEEND (CYEND) signal is used to control transfer of the E-bus between different arbiters. It indicates the performance of the last operations which in turn defines the end of the bus access by that module. This signal originates from the CPU. FIG. 11b illustrates the logic circuitry that is connected to logic circuitry of FIG. 11a and 11b as shown. In FIG. 11c, the INTERRUPT ENABLE (INTEN-) signal has been discussed previously and signifies an interrupt request of one cycle duration. This specific signal is used by the interrupt receive latches on all of the modules to signify that an interrupt vector is being transmitted. The GRANTOUT signal (GRANTOUT) signifies that modules having a lower priority can acquire the bus. Should an internal bus acquisition occur within the module, the GRANTOUT line must go inactive in synchronism with a BUSCLK to block any bus acquisition by a module of lower priority. The parallel request (PRBQ) signal is to be used with a parallel priority arbitration system as discussed in the E-bus system design manual. This signal originates from the arbiter and is sent to the parallel priority manager. The BUSY (BUSYIN-) signal signifies that a transfer is taking place over the bus and that the module must wait to acquire the bus in order to access the bus. The BUSENABLE line (BEN) signifies that this module is controlling the bus. This signal is transferred from the arbiter to the CPU for internal purposes. The bus clock (BUSCLK) signal is the clock for the E-bus as previously discussed. This signal acts as a constant system clock and all bus control operations are synchronized with a positive edge of this clock signal. This clock signal can be produced by either a microprocessor module or an independent clock generator and in a multiprocessor system a bus clock can be asynchronous to the local microprocessor clock. The GRANT IN signal (GRANTIN) signifies that no module of a higher priority is requesting a bus. Modules wishing to take control of the bus must evaluate GRANTIN and BUSY- before arbitration of the bus can occur. The GRANTIN input to the module is the GRANTOUT input of the module with the next highest priority. If a module grant line becomes inactive, it must set its GRANTOUT line inactive with a minimum delay. The transfer acknowledge (TRACK) signal is received from the global memory or any other mass memory device upon the bus and signifies that the memory access has been completed. The reception of the transfer acknowledge signal results in the READY- signal which is sent to the local CPU to signify the completion of memory access. The last signal shown in FIG. 11 is the timeout (TO-) signal which signifies the time out interrupt to the CPU to signify one of the two bus conditions previously explained.

Figure 12:
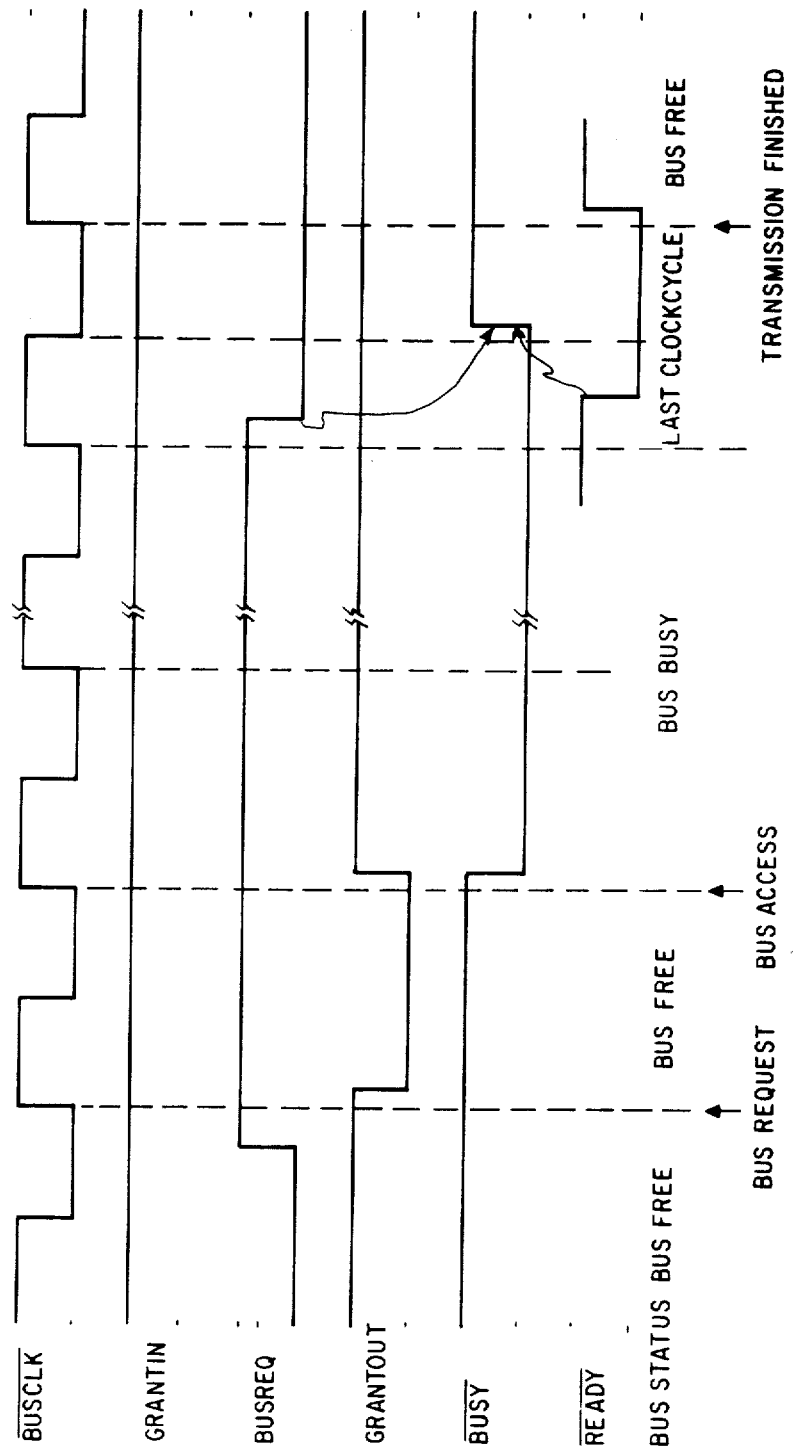
FIG. 12 is a timing diagram of a simple bus arbitration.

FIG. 12 shows the timing of a module forcing rearbitration of the bus. If the module assumes mastery of the bus, then the GRANTOUT can be set active high again synchronously with BUSCLK- since BUSY- is active and no other module can occupy E-Bus. In order to achieve a fast exchange of bus control, BUSY- must be released as early as possible during the last BUSCLK- cycle. The next bus arbitration can then take place on the subsequent positive edge of BUSCLK-.

Figure 13:
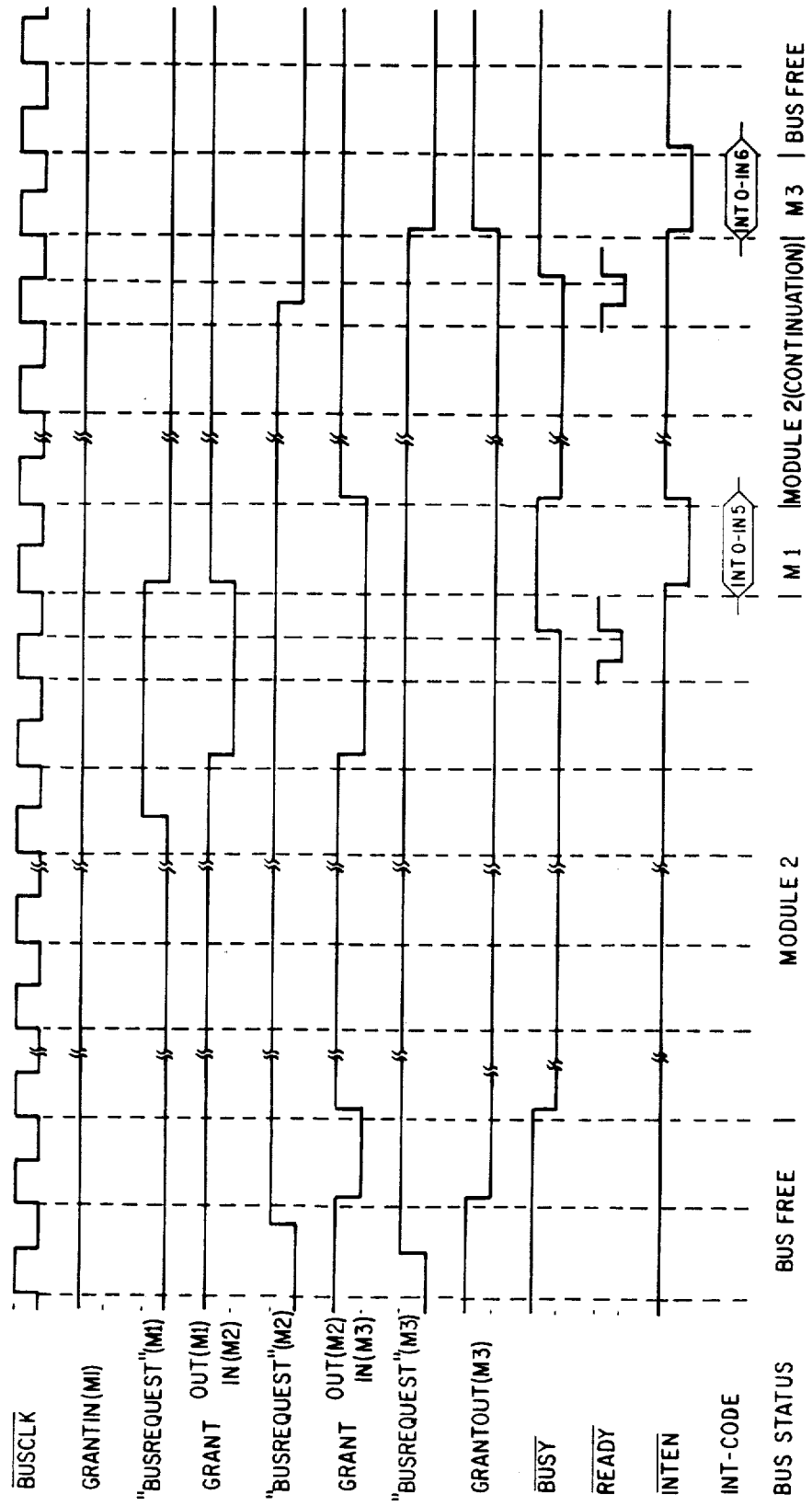
FIG. 13 is a timing diagram of a bus arbitration including three function modules.

The example in FIG. 13 assumes the following situation. First the E-Bus contains module 1 (an interrupt module with highest priority), module 2 (processor module with a medium priority) and module 3 (interrupt module with lowest priority) which are all capable of master of the bus. In addition, modules 2 and 3 receive an internal bus request virtually simultaneously. Module 2 has control over the bus and is interrupted by module 1 for an interrupt cycle. It then accesses the bus again to complete its required bus operation. Module 3 occupies the E-bus once it has become free and no request of a higher priority exist. FIG. 13 illustrates the timing digram of this example. After the first BUSCLK- cycle, the GRANTOUT line is set low by the internal bus request of modules 2 and 3; on the next positive edge of BUSCLK-, module 2 acquires the E-bus since it has a higher priority than module 3 (GRANTIN on module 2 is high). The bus arbitration of module 2 is interrupted by a request from module 1, although module 1 only occupies the bus for one BUSCLK- cycle in order to transmit an interrupt code (INTEN is low). Any module on E-Bus which can occupy the bus for one cycle of BUSCLK need not set BUSY- to low. Since module 1 sets it GRANTOUT output high at beginning of the interrupt cycle, module 2 can acquire this bus again on the next positive edge BUSCLK-. The so called short bus arbitration insures that no time is wasted when the bus is being controlled by more than one module. If an interrupt module sets BUSY- low, even though it only occupies E-Bus for one BUSCLK cycle, the subsequent BUSCLK- cycle is lost. After module 2 has concluded its bus transfer, the short bus access of module 3 can occur.

INITIALIZATION

Typically, a microcomputer board modules must be preconfigured for its particular position in the system (Memory address, slot position, etc.) by setting dual inline switches or providing an appropriate address decode PROM, etc. The software that operates the system must then be set up using software development tools to interact with boards only with fixed positions. The goal of this invention, however, is to make all this unnecessary. Function modules have no address or position set in hardware. Instead, software and hardware addresses are established automatically when the system powers up. The power up initialization sequence does what is necessary to link functions together at the level of function request. In other words, after initialization, all that is necessary to call up a function that is present somewhere in the system is to know its name or code which is uniquely defined. Function requests can be preprogrammed and stored in an application function module or entered during system operation by an operator. The first requirement for the initialization mechanism described here is a memory location or register accessed by the global bus that is addressable by all function modules and initializes upon power up to a known state. This location which will be called the initialization counter has a unique and absolute address (memory CRU or whatever) in all systems using the same environment, i.e. E-Bus). The second requirement is that a bus arbitration/bus lock mechanism such as described as the E-bus arbitrator controls access to the bus. The initialization process proceeds as follows:

1. The system powers up; the initialization counter is set to a known state.

2. All function modules contends for access to the bus.

3. The bus arbiter ensures that one function module only gains access to the bus and it asserts a bus lock and reads the initialization counter.

4. If the initialization counter is "0", this function module
(a) sets up and initializes the global structures in global memory;
(b) identifies itself as module 1;
(c) sets its programmable interrupt and interrupt acknowledge mechanism to respond to interrupt number 1.
(d) adds a list of function names which it can implement to the global function table together with code associating these functions with module 1 or interrupt number 1;
(e) increments the global initialization counter to read 1;
(f) removes the bus lock and releases the bus;
(g) execute a delay before attempting to access the bus again (during which local initialization can be performed). The following sequence will then be executed one or more times.

5. Another function module gains access to the bus, and reads the initialization counter.

6. Seeing that the counter has a non-zero value of "n", this module does not initialize and set up the global data structure, however it: (a) identifies itself as module n+1, (b) sets its programmable interrupt mechanism and interrupt acknowledge mechanism to respond to interrupt number n+1; (c) adds the list of function names which it implements to the global function table, together with a code associating these functions with the module N+1 or interrupt N+1; (d) increments the global initialization counter to read n+1; (e) removes bus lock and releases the bus; and (f) executes the delay before accessing the bus again.

At some time following the module delays, the function modules will access the bus as required to perform their defined operations. Some function modules may only carry out these operations in response to request from other modules. The delay time should be sufficient to insure that all initialization has been performed. No positive indication can be given that initialization is complete because the number of modules in the system is indeterminate. If a module should send a function request to a module not present in the system, or not yet configured in the system, the system integrity will be maintained because a standard error response will be sent to the requesting function. Certain parameters, such as the delay time, the absolute address of the initialization counter, and the coding of interrupts and interrupt acknowledgements will be chosen according to the characteristics of the particular backplane environment and must be fixed for all times for that environment. It should be possible to define some variant of the above mechanism to work for every environment that permits independent modules with a common memory and an arbitration/slot mechanism for access to the memory. In addition, a module interrupt mechanism of some kind is highly desirable though this could be substituted by regular polling of the same common memory by each module.

Where it is not possible to guarantee the power up state of the initialization counter, a variant of the above sequence can be used whereby one function module is defined as the initializer, perhaps by the setting of a jumper. This initializer which identifies itself by reading the jumper accesses the bus and sets the initial value of the location counter. All other modules (identifying themselves and not being the initializer) will stay off the bus and initialize their response to a common known value. Having performed the items above, the initializer will interrupt all of the modules which will then contend for the bus and cycle through items 5 and 6 as above.

Figure 14:
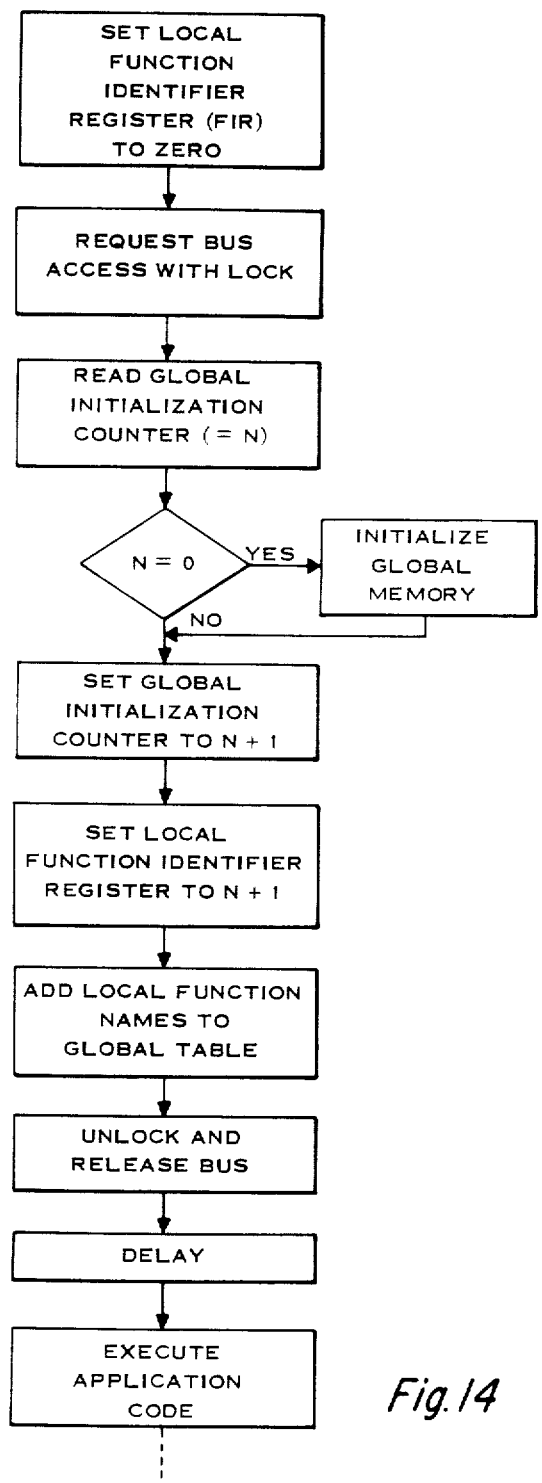
FIG. 14 is a flow chart for software to initialize a module connected to a global memory.
Figure 15:
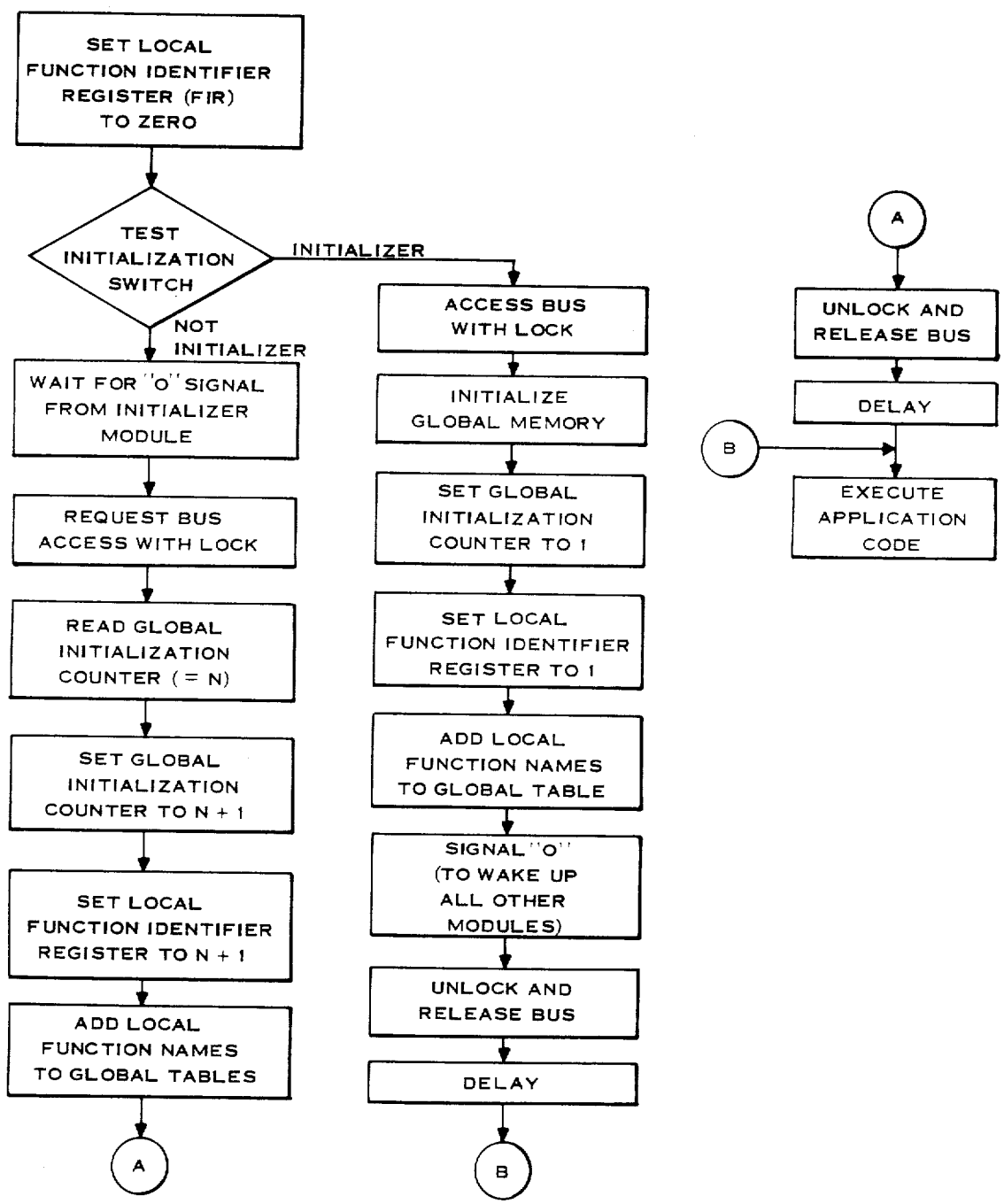
FIG. 15 is a flow chart for software to initialize a module connected to a global memory that is connected to the E-bus.
Figure 16:
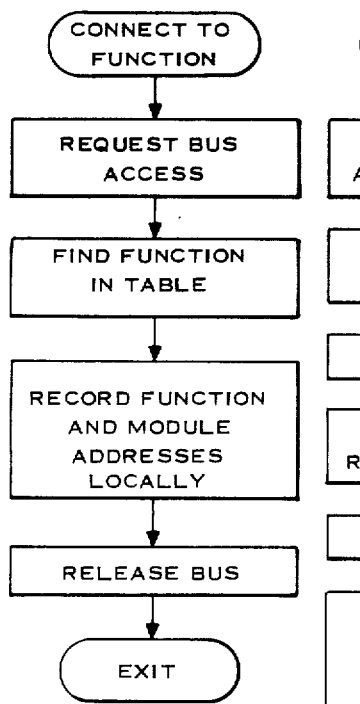
FIG. 16 is a flow chart for the connect operation by which a module determines from the function identifer table the function identification or the module address where a particular function can be performed.
Figure 17:
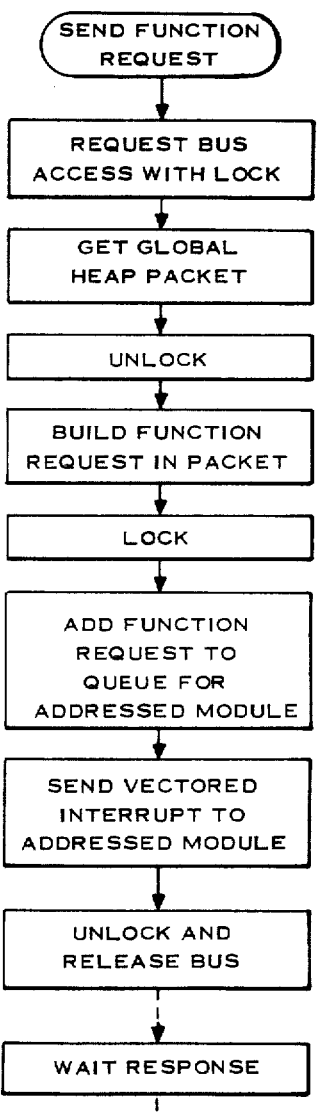
FIG. 17 is a flow chart illustrating the send function request soft ware.
Figure 18:
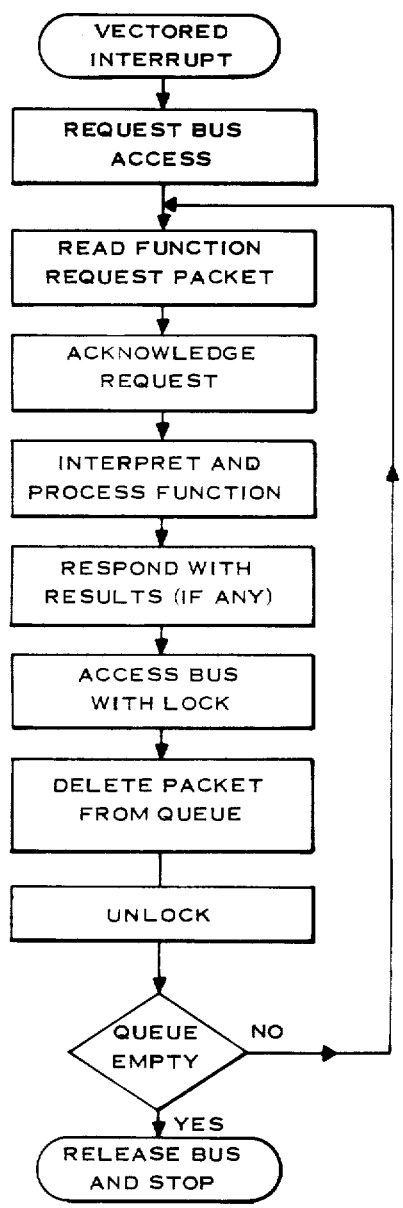
FIG. 18 is a flow chart illustrating the soft ware to be executed by a function module receiving a request from another module.

This mechanism preserves the requirement that all modules should have identical software. It is slightly less satisfactory because it requires the jumper setting one more module. However, it may be used on E-Bus which in that case requires that one module be set up to generate the bus clock. The same physical jumper will be designed to set BUSCLK- and identify the module as the initializer. Systems with none or more than one jumper set simply will not initialize. The code to perform this initializing sequence will be contained in ROM on each function module. Note that FIG. 14 illustrates a flowchart of the initialization sequence just described. FIG. 15 illustrates another alternative to this type of "algorithm". It should be noted that the "algorithm" in FIG. 15 is the one preferred for the E-Bus. During bus assembly, one board module must be set to drive the system clock (BUSCLK). This requires the setting of one jumper initialization switch which determines "BUSCLK" as input or output. The status of this switch can be read by the processor and is used to identify one module only as the system initializer to set up the data structures in global memory. FIG. 16 illustrates the flow for connect operation by which a module determines from the function identifier table the function identification or the module address where a particular function is to be found. FIGS. 17 and 18 illustrate the flow for the sending and receiving of function request. The receive algorithm is activated upon receiving a vectored interrupt by the function module concerned.

In general it is not necessary for a self-configuring system to have a global memory. The role performed by tables in global memory may instead be performed by one of function modules accessed via a fixed address or identifier which contains the tables or their equivalent internal to itself. In such a case, no global memory would be required. This method is appropriate for a network configuration where there is no concept of global memory although it can also be used on a backplane bus. The requirement is for some one place in the system where logical arbitration decisions, (such as "What is my module identifier?) can be performed and which can act as an authority for information (such as where can I access the function name "X"). This is a logical arbiter as distinct from a physical or electronic arbiter which resolves conflicts of access to resources, such as communication bus.

The requirements for a logical arbiter are that it shall be capable of making decisions or judgments which might require some information process, i.e., searching or updating tables, but that each decision must be logically self-contained and indivisible so that one decision cannot possibly be corrupted by another.

In a configuration without global memory, self-configuration proceeds in a similar way to a method described except that each module requests access through the local arbiter to make the judgment on what its module identifier will be and gives the logical arbiter its list of function names to add to the arbiter's tables.

In a network implementation, messages will be passed from one function module via some kind of data link. The concept of placing a function request packet in global memory to be removed by another function module does not apply. Rather the function request packet will be transmitted directly to the appropriate module. Typically, data communication protocol will provide this capability by including the network identifier of the destination in the function request packet. An issuing module will broadcast the packet across the network; receiving modules include some hardware which can recognize network identifier intended for them and extract appropriate data package from the network. However, in conventional systems as network identifier is pre-allocated during the design of the system and established for each module by setting switches during installation or by fixing the network identifier into hardware or firmware during the development of the module. A self-configuring function module must be able to program itself while the system is operating (typically during self-configuration). To respond to network identifiers allocated by the logical arbiter and it must have necessary hardware and firmware to participate in the self-reconfiguration process as described.

Figure 19:
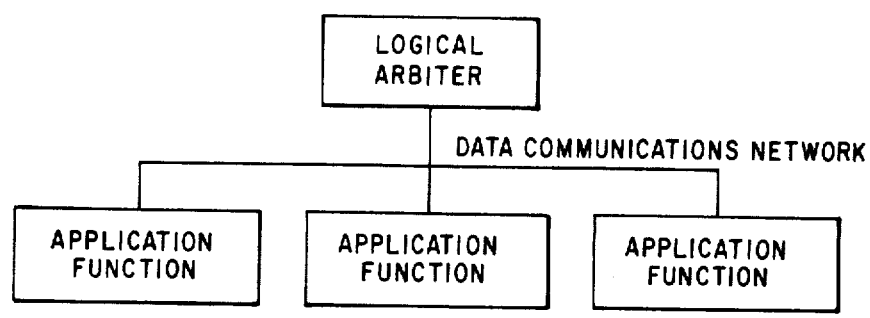
FIG. 19 is a block diagram illustrating the system containing a logical arbiter.

FIG. 19 illustrates a network implementation with a dedicated logical arbiter but no global memory. Messages are passed using the data communications network protocol.

Figure 20:
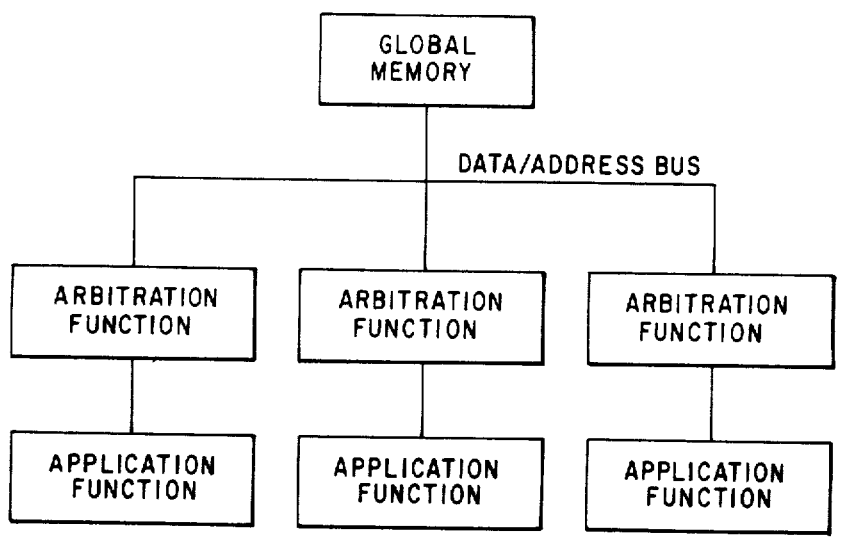
FIG. 20 is a block diagram illustrating the system including a global memory.

FIG. 20 illustrates an address/data bus implementation with the combination of local processors and global data structures used to implement both the logical arbitrator with message passing.

The logical arbitrator concept is in fact a more general solution than the specific E-bus mechanism described and the E-bus mechanism can be understood in terms of it. The E-Bus system can be regarded as implementing a distributed logical arbiter. If a boundary is drawn between the part of function module that manages the data structure in global memory and the part that implement application functions, then the operation is identical to what is described above. The arbitration function of all function modules together with the data structures in global memory form a distributed entity which works identically to the separate logical arbiter shown in FIG. 19. As before, the application part of each function module accesses the logical arbiter to perform certain operations. The fact that a local processor is used to perform the operation rather than a separate dedicated global memory is an implementation detail that may affect system performance but will not change the logical operation performed, i.e., the total system performance. All parts of the logical arbiter which may change during execution remain in one place, the global memory. The program code which determines the action of the logical arbiter is fixed and may be safely performed by any processor. A logical arbiter operation is performed by a request to the local (logical arbiter) and the local processor obtains and locks the bus so that its manipulation of the global data structure becomes an indivisible operation. The local processor performs required operation and then releases the bus. All information that might be relevant to another processor is in global memory. Asserting the bus lock insures that each processor can carry out a complete operation on the global data structure without interruption, leaving the data structure in a consistent state so that they can be safely manipulated by another processor.

Depending on the way the mechanisms are implemented, the logical arbiter may or may not be accessed each time a function request is transmitted. Often to optimize system performance, it becomes appropriate to design a function call mechanism so that the logical arbiter is accessed just once by a module issuing a function request, the first time that particular function is called by that module. The issuing module will pass the logical arbiter the name or code of a function and the logical arbiter will return the access code or network identifier, station ID, channel number, etc., where that function module can be reached. This operation is called a connect. This mechanism allows the connect to be performed on a possibly extensive function name while actual function requests are performed using the optimized access code. The issuing module stores the access code locally and uses it for future calls to that function module. It will be necessry to update local function table if modules are added or removed, i.e., reconfiguration. The logical arbiter remains the ultimate referee in the system if any conflict is discovered.

In a system with a separate logical arbiter, there is no need for one function module to identify itself as an initializer. All global initialization operations are performed by the dedicated logical arbiter. A module on power up or when it is added to the system simply requests an access to the local arbiter in order to announce to the arbiter that it exist. The interaction between the new module and the logical arbiter takes care of everything that is necessary to configure the module as a fully functioning part of the system.

In the general case, it must be possible to route a function request to a place in the system where it can be executed. In systems designed around a backplane busses and networks, each module will typically have unique network identifiers or station identification that can be used to route messages directly to that module. In general, modules may have programmed hardware which permits them to respond to a range of network identifiers. Certain network identifiers or station ID's or channel numbers may be dedicated for all time to certain functions so that any module can send requests directly to these functions without requiring information from 'the local arbiter. At least one such dedicated identifier is required for the local arbiter itself. A module may respond to certain fixed identifiers which are allocated for all time and additionally to identifiers which are allocated dynamically by the local arbiter when the module configures itself into the system. Modules should be capable of participating in a network before network identifiers are allocated in order to take part in the self-configuration process.

Self-configured systems can be connected together into larger networks. Local logical arbiter can resolve local decisions. Two or more systems connected together will go through a self-configuration process similar to that described for individuals modules within the system, but at a higher level. A higher level local arbiter will be required to arbitrate between systems depending on the nature of the connection. This arbiter will be a separate entity or one of the systems will be designated to perform this role or the role of the arbitrator will be performed by a combination of local processor and global memory as described above.

What we claim is:

1. A data processing system comprising:
   an information bus for transferring data between a plurality of module slots, said plurality of module slots including one unique module slot;
   a logical arbiter memory means connected for transfer of data to and from said information bus, for storing therein a global function table of function names together with their corresponding module number and having an initialization counter;

a plurality of function modules each connected to one of said module slots for transfer of data to and from said information bus, each function module having
  (1) a bus priority means for determining a bus priority for control of data transfer via said information bus,
  (2) function means to perform at least one computational function in response to a corresponding function request from said information bus, each such computational function having a corresponding one of said function names, and
  (3) initialization means actuated upon each initial application of electric power to said function module, said initialization means including (a) means for determining whether said function module is connected to said unique module slot, (b) means for requesting information bus control immediately upon initialization if said function module is connected to said unique module slot and for waiting for a wake up signal from said function module connected to said unique module slot via said information bus and then requesting information bus control if said function module is not connected to said unique module slot, (c) means for initializing said global function table, setting said initialization counter to "1" and reading and storing said initialization counter state if said function module is connected to said unique module slot, and for reading and storing said initialization counter state and then incrementing said initialization counter if said function module is not connected to said unique module slot, (d) means for assigning one of said module numbers to said function module corresponding to said stored state of said initialization counter thereby making said function module responsive to function requests directed to said module number, (e) means for transferring to said logical arbiter memory means for storage in said global function table said function name and said corresponding module number for each computational function, (f) means for generating said wake up signal and for transmitting said wake up signal to other function modules via said information bus if said function module is connected to said unique module slot, and (g) means for executing a delay for a predetermined period of time upon storing said function name and said module number in said global function table said predetermined period being sufficient to permit initialization by said initialization means of all other function modules; and a bus arbitration means connected to said bus priority means of each function module via said information bus for permitting one and only one function module to control data transfer via said information bus based upon said bus priority of any function module requesting control of said information bus.

2. A data processing system as claimed in claim 1, wherein:
  each of said function modules further includes means for requesting a selected computational function from another function module by (a) transmitting a function address request to said logical arbiter memory means via said information bus requesting the module number of another function module having said selected computational function, and (b) transmitting said selected computational function request to said module number, and
  said logical arbiter memory means further includes means for suppling via recall from said global function table said module number corresponding to a selected computational function to a function module in response to a function name request from said function module.

3. A data processing system as claimed in claim 2, wherein:
  at least one function module further includes a local function table and means for storing in said local function table the module number corresponding to a computational function upon initial request for said computational function, and thereafter recalling said module number from said local function table without resort to said global function table upon further requests for said computational function.

4. A data processing system comprising:
  an information bus for transferring data between a plurality of module slots, said plurality of module slots including one unique module slot;
  a logical arbiter memory means connected for transfer of data to and from said information bus, having a module number designating means for designating module numbers by assigning successive module numbers to said function modules in order upon initialization, a global function table for storing therein function names together with their corresponding module number, and a function address means for transmitting said module number corresponding to a function name in response to a function address request on said information bus;
  a plurality of function modules each connected for transfer of data to and from said information bus, each function module having
    (1) a bus priority means for determining a bus priority for control of data transfer via said information bus,
    (2) function means to perform at least one computational function in response to a corresponding function request from said information bus at a corresponding module number designated by said module number designation means, each such computational function having a corresponding function name, and
    (3) initialization means actuated upon each initial application of electric power to said function module, said initialization means including (a) means for determining whether said function module is connected to said unique module slot, (b) means for requesting information bus control immediately upon initialization if said function module is connected to said unique module slot and waiting for a wake up signal from said function module connected to said unique module slot via said information bus and then requesting information bus control if said function module is not connected to said unique module slot, (c) means for initializing said global function table, and noting said assigned module number if said function module is connected to said unique module slot, and for reading and storing said assigned module number if said function module is not connected to said unique module slot, (d) means for assigning one of said module number to said function module corresponding to said assigned module number thereby making said function module responsive to function requests directed to said module number, (e) means for transferring to said logical arbiter memory means for storage in said global function table said function name for each computational function, (f) means for generating said wake up signal and for transmitting said wake up signal to other function modules via said information bus if said function module is connected to said unique module slot, (g) means for executing a delay for a predetermined period of time upon storing said function name in said global function table, said predetermined period being sufficient to permit initialization by said initialization means of all other function modules; and a bus arbitration means connected to said bus priority means of each function module via said information bus means for permitting one and only one function module to control data transfer via said information bus based upon said priority of any function module requesting control of said information bus.

5. A data processing system as claimed in claim 4, wherein:

each of said function modules further includes means for requesting a selected computational function from another function module by (a) transmitting a function address request to said logical arbiter memory means via said information bus requesting the module number of another function module having said selected computational function, and (b) transmitting said selected computational function request to said module number, and said logical arbiter memory means further includes means for supplying via recall from said global function table said module number corresponding to a selected computational function to a function module in response to a function name request from said function module.

6. A data processing system as claimed in claim 5, wherein:

at least one function module further includes a local function table and means for storing in said local function table the module number corresponding to a computational function upon initial request for said computational function, and thereafter recalling said module number from said local function table without resort to said global function table upon further requests for said computational function.

* * * * *